Jan. 2, 1934.   A. F. MASURY   1,941,704
THERMOSTATIC RELAY
Filed Feb. 21, 1933
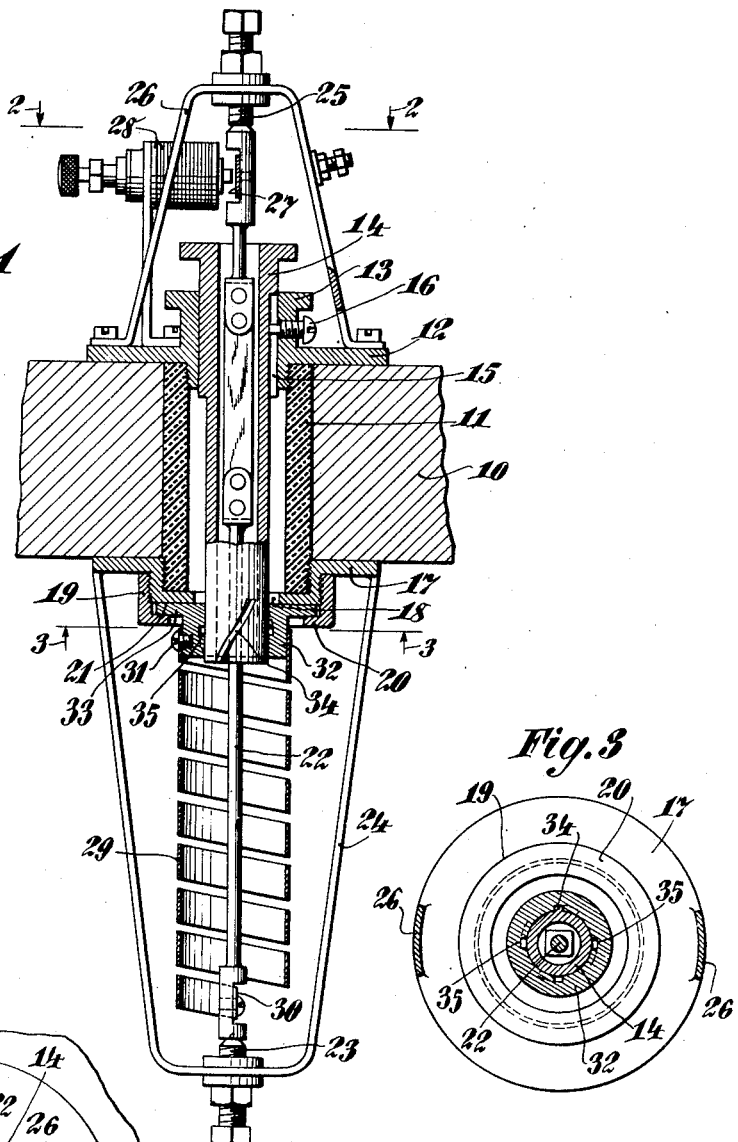
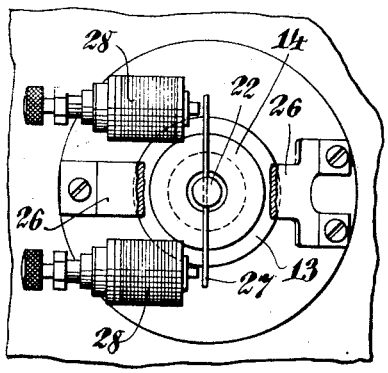
INVENTOR
Alfred F. Masury,
BY
Redding, Greeley, O'Shea & Campbell
HIS ATTORNEYS Patented Jan. 2, 1934

1,941,704

UNITED STATES PATENT OFFICE 1,941,704

THERMOSTATIC RELAY

Alfred F. Masury, New York, N. Y., assignor to International Motor Company, New York, N. Y., a corporation of Delaware Application February 21, 1933. Serial No. 657,763

4 Claims. (Cl. 200—139)

The present invention relates to thermostats and embodies, more specifically, an improved form of thermostat for use in controlling electrical circuits. More particularly, the invention embodies an improved thermostatic relay which is adapted for use in refrigerating systems wherein the degree of refrigeration is automatically controlled by an electro-responsive device.

In systems of the above character, it is frequently necesary to vary the range of temperatures which are preserved in a given space and, in order that such operation may be effected, thermostatic relays have been provided heretofore by means of which the electrical system for controlling the refrigerating mechanism may be suitably actuated. In one form of mechanism now available and illustrated in the copending application of Post and Hanshew Ser. No. 628,658 filed August 13, 1932, for Thermal relay for refrigerating mechanism, a thermostatic relay construction is shown wherein the thermostatic element is of helical form and mounted to actuate a rotatable spindle upon changes in temperature within a given space. The present invention embodies an improved thermostat construction by means of which variations in the range of temperatures maintained may be readily and accurately effected.

A further object of the invention is to provide an improved thermostat construction wherein a predetermined loading may be applied to the thermostatic element in a convenient and effective manner to vary the temperature range maintained within a refrigerating compartment.

Further objects, not specifically enumerated above, will be apparent as the invention is described in greater detail in connection with the accompanyng drawing, wherein:

Figure 1 is a view in section, taken on a vertical plane passing through a thermostatic relay constructed in accordance with the present invention.

Figure 2 is a view in section, taken on the plane indicated by the line 2—2 of Figure 1, and looking in the direction of the arrows.

Figure 3 is a view in section, taken on the plane indicated by the line 3—3 of Figure 1, and looking in the direction of the arrows.

With reference to the above drawing, the wall of a refrigerating compartment or other device is indicated at 10 and may be provided with a bushing 11 into the upper extremity of which a base plate 12 is threaded. The base plate is formed with a cylindrical extension 13 within which a sleeve 14 is slidably mounted, the sleeve being formed with a groove 15 parallel to the axis thereof into which a set screw 16 is adapted to be moved.

The bushing 11 carries a threaded bottom mounting plate 17 which is formed with an aperture 18 and over which a retaining nut 19 is threaded. The retaining nut 19 is provided with a flange 20 which is normally spaced from a parallel abutment 21 formed upon the bottom plate 17 and within which the aperture 18 is formed.

Extending through the bushing 11 and sleeve 14 is a spindle 22 which is mounted upon a step bearing 23, carried by a bracket 24 which is formed upon the bottom plate 17. The upper extremity of the spindle 22 is journaled within an adjustable bearing 25 which is mounted upon a bracket 26 secured to the base plate 12. An armature 27 is mounted upon the spindle 22 and is adapted to be actuated by electro-magnets 28 which are spaced opposite the ends of the armature. Rotary movement of the spindle 22 is effected upon changes in temperature adjacent the bottom plate 17 by means of a helical thermostatic element 29 which is secured to the spindle adjacent the bottom thereof at 30. The other end of the helical coil 29 is secured at 31 to a sleeve 32 formed with a peripheral flange 33 which is received between the flange 20 and the boss 21. The sleeve 32 and flange 33 is limited against axial movement by the flange 20 and boss 21 but may rotate, thus varying the tension or loading of the coil 29.

Rotation of the sleeve 32 is effected by axial movement of the sleeve 14, sleeve 14 being provided with spiral ribs 34 which are received within similarly formed grooves 35 within the sleeve 32. In this manner, a predetermined tension or loading may be set up within the coil 29, thus varying the temperature range within which a predetermined response of the coil 29 is obtained.

This mechanism will be seen to provide a means for conveniently and effectively varying the temperature range of thermostats.

While the invention has been described with specific reference to the accompanying drawing, it is not to be limited, save as defined in the appended claims.

I claim as my invention:

1. A thermostat comprising a rotatable spindle, a helical thermal element secured at one end to the spindle, a sleeve mounted rotatably with respect to the spindle, means to secure the other end of the element to the sleeve, a sleeve concentric with the spindle and constrained to axial motion, and a curved spline connection between the first named sleeve and element.

2. A thermostat comprising a rotatable spindle, top and bottom mounting plates, brackets on the plates to journal the spindle, a sleeve mounted in the top plate for axial motion, a sleeve mounted in the bottom plate over the first sleeve, and a connection between the sleeves to cause rotation of the second sleeve upon axial motion of the first, and a thermal element secured between the second sleeve and spindle.

3. A thermostat comprising a rotatable spindle, top and bottom mounting plates, brackets on the plates to journal the spindle, a sleeve mounted in the top plate for axial motion, a boss on the bottom plate, a retaining unit secured to the bottom plate and formed with a flange spaced from the boss, a sleeve having a flange rotatable between the boss and first flange, a curved spline connection between the sleeves, and a thermal element secured between the second sleeve and spindle.

4. A thermostat comprising a rotatable spindle, a helical thermal element secured at one end to the spindle, a sleeve mounted rotatably with respect to the spindle, means to secure the other end of the element to the sleeve, a second sleeve mounted between the first sleeve and spindle and concentric with the spindle and constrained to axial motion, and a curved spline connection between the first named sleeve and the element.

ALFRED F. MASURY.